United States Patent [19]

Hirose et al.

[11] Patent Number: 4,690,494

[45] Date of Patent: Sep. 1, 1987

[54] FERRULE HOLDING DEVICE FOR OPTICAL FIBER CONNECTOR

[75] Inventors: Takao Hirose; Norio Kumekawa, both of Shimotsuga, Japan

[73] Assignee: Daiichi Denshi Kogyo Kabushiki Kaisha, Tokyo, Japan

[21] Appl. No.: 729,245

[22] Filed: May 1, 1985

[30] Foreign Application Priority Data

May 7, 1984 [JP] Japan ............... 59-65497[U]

[51] Int. Cl.$^4$ ................. G02B 6/36; G02B 7/26
[52] U.S. Cl. ................. 350/96.20; 350/96.21
[58] Field of Search ............. 350/96.20, 96.21, 96.22

[56] References Cited

U.S. PATENT DOCUMENTS

| | | | |
|---|---|---|---|
| 4,140,365 | 2/1979 | Burger et al. | 350/96.22 |
| 4,167,303 | 9/1979 | Bowen et al. | 350/96.21 |
| 4,178,068 | 12/1979 | Hoover | 350/96.22 |
| 4,268,115 | 5/1981 | Slemon et al. | 350/96.21 |
| 4,279,469 | 7/1981 | Forman | 350/96.22 |
| 4,427,879 | 1/1984 | Becher et al. | 350/96.15 |
| 4,445,750 | 5/1984 | Grois et al. | 350/96.21 |
| 4,522,463 | 6/1985 | Schwenda et al. | 350/96.21 |
| 4,611,887 | 9/1986 | Glover et al. | 350/96.21 |
| 4,645,295 | 2/1987 | Pronovost | 350/96.21 |

Primary Examiner—Robert E. Wise
Attorney, Agent, or Firm—Silverman, Cass, Singer & Winburn, Ltd.

[57] ABSTRACT

A ferrule holding device is used for holding a ferrule accommodating optical fibers therein. Two ferrules are inserted in a sleeve extending in two connector bodies of the connector to bring the optical fibers to be in aligned and close contact with each other by spring means urging the ferrules toward each other. According to the invention, the device comprises a spring urged sleeve consisting of a cylindrical body having an outer diameter somewhat smaller than an inner diameter of each the connector body. The cylindrical body is provided at plural locations with resilient curved pieces having hooks outwardly extending but depressible inwardly of an outer periphery of the cylindrical body. The connector body is formed with anchoring apertures into which the hooks of the resilient curved pieces extend so as to hold the spring urged sleeve in the connector to support the spring means urging the ferrule. A taking-off tool having taking-off pieces is inserted between the connector body and the curved pieces of the spring urged sleeve or into insert apertures formed in the connector body so as to push the curved pieces inwardly toward an axis of the connector body.

8 Claims, 9 Drawing Figures

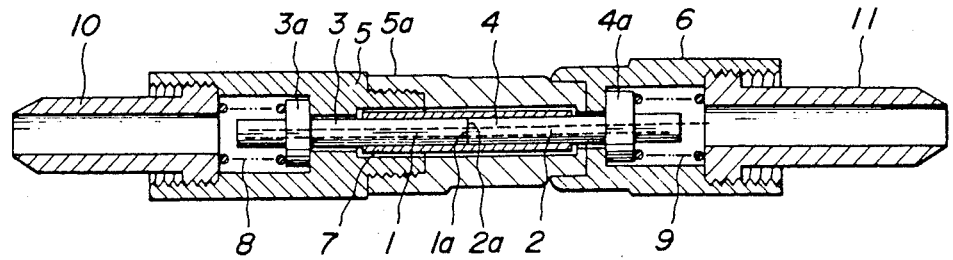
FIG. 1
PRIOR ART
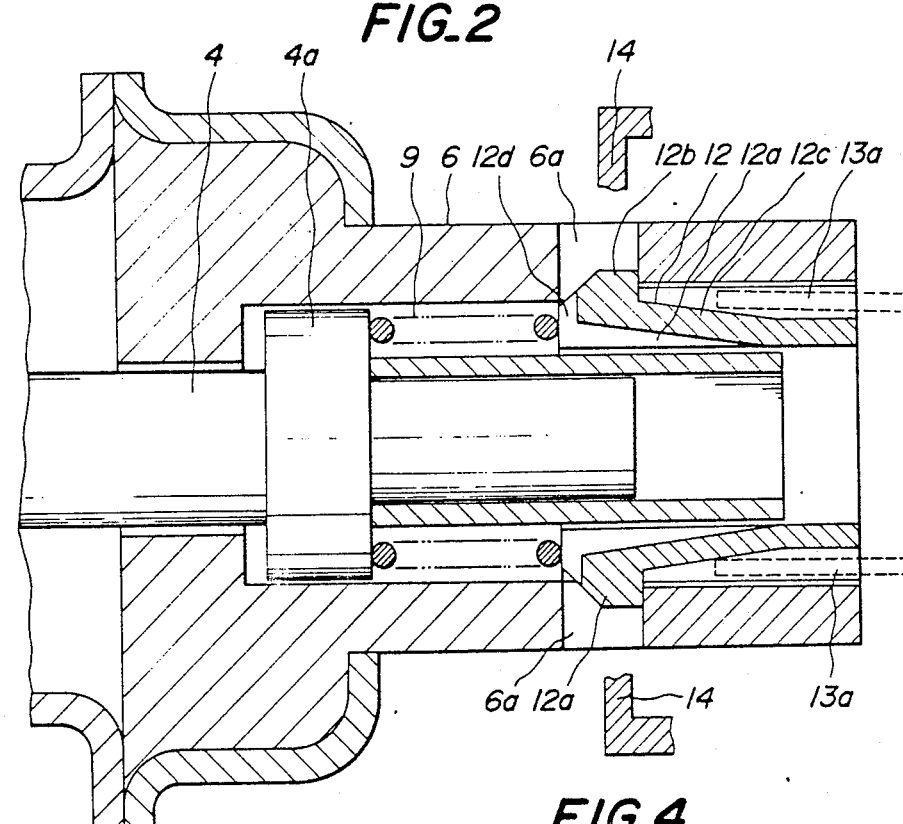
FIG. 2
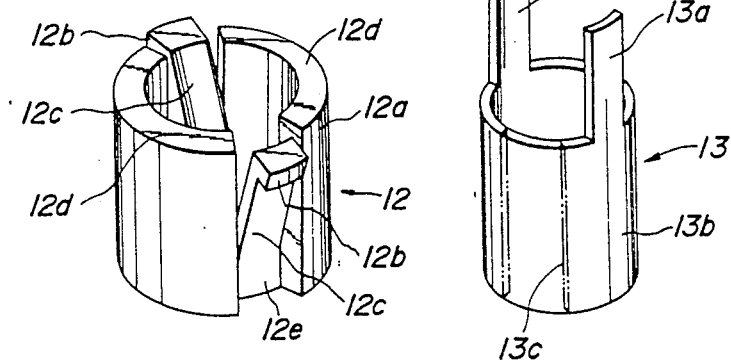
FIG. 3
FIG. 4

FIG_5a
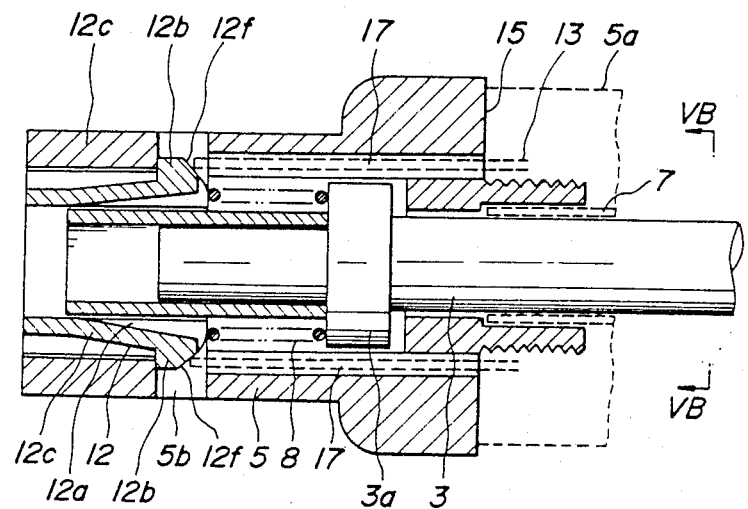
FIG_5b
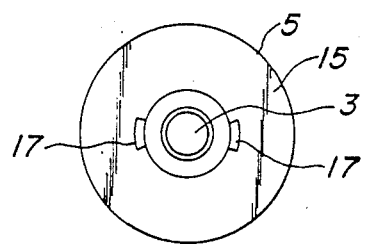

FIG._6a
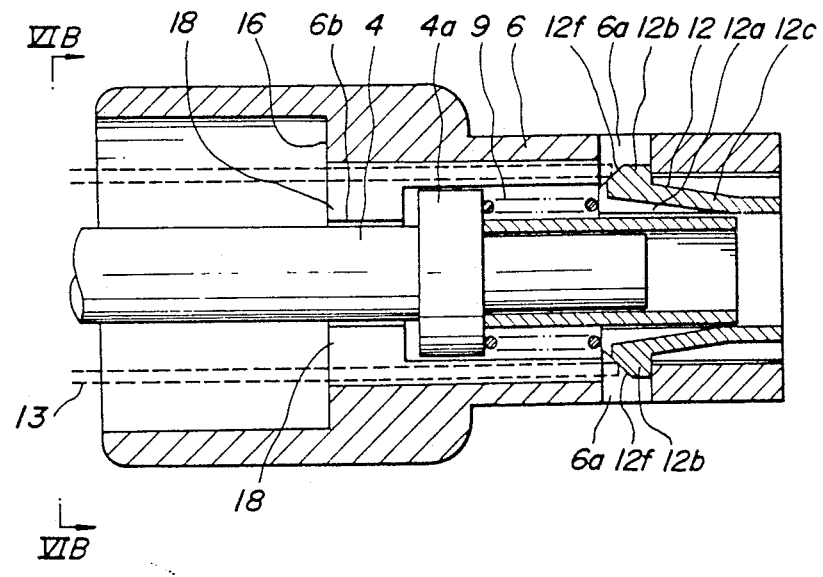
FIG._6b
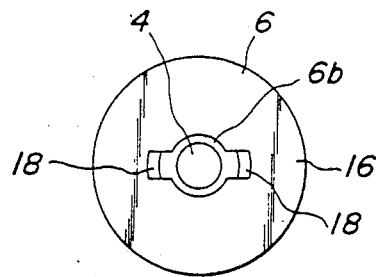
FIG._7
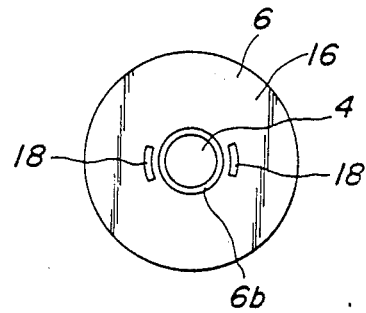

FERRULE HOLDING DEVICE FOR OPTICAL FIBER CONNECTOR

BACKGROUND OF THE INVENTION

1. Field of the Invention:

This invention relates to a ferrule holding device for an optical fiber connector.

2. Description of the Prior Art:

In order to connect optical fibers by means of an optical fiber connector with less transmission loss, it is important to bring their ground end faces into close contact with each other highly coaxially without any clearance between whole end faces. For this purpose, a connector hitherto used has been constructed as shown in a longitudinal sectional view of FIG. 1.

In more detail, optical fibers 1 and 2 having exposed end faces 1a and 2a are centrally held in ferrules 3 and 4 highly coaxially with each other and the ferrules 3 and 4 are inserted into a sleeve 7 which has been movably supported in a sleeve holding body 5a of one connector body 5. In this manner, the ferrules 3 and 4 and hence the optical fibers 1 and 2 are kept highly coaxially to each other with a reforming effect of the sleeve 7. On the other hand, the ferrules 3 and 4 are provided with support flanges 3a and 4a which are retained by springs 8 and 9 interposed between the flanges and retention sleeves 10 and 11 threadedly engaged in the connector bodies 5 and 6, thereby maintaining the end faces 1a and 2a of the optical fibers 1 and 2 supported in the ferrules 3 and 4 in close contact with each other with the aid of spring forces of the springs 8 and 9.

With the above arrangement, however, if there is any dust on the end faces 1a and 2a of the optical fibers in case of releasing the connection of the fibers or other cases, the end faces abut against each other through the dust which would obstruct the close contact of the end faces to increase the transmission loss. It is therefore necessary to clean the end faces of the optical fibers at any time. In general, however, it is difficult to clean the end face because a tip end of the one ferrule 3 is positioned in the sleeve 7 remote from its end in order to keep the fibers coaxial. It is also difficult to clean the end face of the fibers on the side of the other ferrule 4 even exposed out of the sleeve 7 as it is fitted in the connector body 5.

In order to facilitate cleaning the end faces of optical fibers, the retention sleeves 10 and 11 are adapted to be threadedly engaged with the connector bodies 5 and 6. After the retention sleeves 10 and 11 have been removed from the bodies, the springs 8 and 9 are removed to take out the ferrules 3 and 4. With this arrangement, however, the connector bodies are complicated in construction. Moreover, there is a risk of the retention sleeves 10 and 11 being loosened to change the contacting force between the end faces of the optical fibers so as to make unstable the connection of the fibers. In order to avoid this, it is necessary to firmly screw the retention sleeves 10 and 11 into the bodies so as not to permit the retention sleeves to be loosened. In this case, the ferrules cannot be removed from the connector body unless the retention sleeves 10 and 11 are unscrewed along overall length of their screw-threads. Therefore, the assembling and disassembling of the connector are troublesome and time-consuming. Moreover, a particular precaution is needed so as not to assemble the connector without tightening the retention sleeves 10 and 11.

SUMMARY OF THE INVENTION

It is a principal object of the invention to provide an improved ferrule holding device for an optical fiber connector which eliminates all the disadvantages of the prior art to facilitate cleaning and grinding ferrules and optical fibers.

In order to achieve this object, a ferrule holding device for an optical fiber connector, said connector including two connector bodies, a sleeve extending in said two connector bodies, and two ferrules respectively accommodating optical fibers therein to be aligned with each other when the ferrules are inserted in said sleeve in end-to-end relationship, said ferrules being urged by spring means so as to bring ends of said optical fibers into close contact with each other, said ferrule holding device according to the invention comprises a spring urged sleeve consisting of a cylindrical body having an outer diameter somewhat smaller than an inner diameter of each said connector body, said cylindrical body being provided at plural locations with resilient curved pieces having hooks outwardly extending but depressible inwardly of an outer periphery of said cylindrical body, and each said connector body being formed with anchoring apertures into which said hooks of said resilient curved pieces extend so as to hold said spring urged sleeve in said connector to support said spring means urging said ferrule.

The resilient curved pieces are preferably diametrically opposed integral parts of the cylindrical body formed by cutting the parts.

According to the invention, a taking-off tool is provided which consists of a thin cylindrical shell body formed with taking-off pieces, the shell body being able to be inserted between the connector body and the curved pieces of the spring urged sleeve inserted therein so as to push the curved pieces inwardly toward an axis of the connector body.

A taking-off tool may be formed to have an urging nail which is able to be inserted into the anchoring aperture in the connector body from an external side thereof so as to push the curved piece inwardly toward an axis of the connector.

In a preferred embodiment of the invention, each the connector body is formed with insert apertures extending from an exposing end face of the connector body to the anchoring apertures such that when the taking-off tool is inserted into the connector body, tip ends of the taking-off pieces of the tool are located at chamfered surfaces of the hooks engaging in the anchoring apertures in the connector body so as to push the hooks inwardly toward the axis of the connector body when the tool is further inserted into the connector body.

In order that the invention may be more clearly understood, preferred embodiments will be described, by way of example, with reference to the accompanying drawings.

BRIEF DESCRIPTION OF THE DRAWINGS

FIG. 1 is a sectional view of an optical fiber connector illustrating a ferrule holding device of the prior art;

FIG. 2 is a sectional view of a ferrule holding device of one embodiment of the invention;

FIG. 3 is a perspectivre view of a spring urged sleeve to be used in the device shown in FIG. 2;

FIG. 4 is a perspective view of a taking-off tool for removing the spring urged sleeve from the connector;

FIG. 5a is a sectional view of one part of a connector illustrating another embodiment of the device according to the invention;

FIG. 5b is a side elevation of the connector as viewed in directions of arrows VB;

FIG. 6a is a sectional view of the other part of the connector illustrating the device shown in FIG. 5a;

FIG. 6b is a side elevation of the connector as viewed in directions of arrows VIB; and FIG. 7 is a side elevation of a connector illustrating a modification of the device according to the invention.

DETAILED DESCRIPTION OF THE PREFERRED EMBODIMENTS

Referring to FIGS. 2 and 3, a ferrule holding device according to the invention utilizes a spring urged sleeve 12 instead of the sleeves 10 and 11 above mentioned, which has an outer diameter somewhat smaller than an inner diameter of a connector body 6. The spring urged sleeve 12 comprises a cylindrical body 12a formed for example at diametrically opposed locations with resilient curved pieces 12c formed by cutting the parts of the sleeve 12 and outwardly extending and having a thickness so as to be depressed inwardly of an outer periphery of the cylindrical body 12a. Each the curved piece 12c is formed on its free end with a hook 12b. On the other hand, as shown in FIG. 2, the connector body 6 is formed at diametrically opposed locations with anchoring apertures 6a passing therethrough for receiving the hooks 12b of the curved pieces 12c of the sleeve 12. The locations of the anchoring apertures 6a are so determined that the hooks 12b are received in the apertures 6a when the sleeve 12 has been inserted into the connector body with a front end 12a of the sleeve 12 urging a spring 9.

Referring to FIG. 2, after a ferrule 4 and a spring 9 have been inserted into the connector body 6, the spring urged sleeve 12 is inserted into the connector body 6 to extend the hooks 12b into the anchoring apertures, thereby receiving and holding the ferrule 4 in the connector body 6, while supporting one end of the spring 9 by the front end 12d of the spring 9.

In order to remove the ferrule 4 out of the connector body 6, for example, a taking-off tool 13 as shown in FIG. 4 is used. The taking-off tool 13 in the form of a thin cylindrical shell body 13b is provided with two taking-off pieces 13a having thicknesses adapted to be inserted between the connector body 6 and the curved pieces 12c of the sleeve 12 inserted therein and adapted to be aligned with the curved pieces 12c. The taking-off pieces 13a of the tool 13 are inserted between the connector body 6 and the curved pieces 12c so as to push the curved pieces inwardly toward an axis of the connector body to disengage the hooks 12b from the anchoring apertures 6a, thereby enabling the spring urged sleeve 12 to be pulled out of the connector body 6 and then removing the spring 9 and the ferrule 4 out of the body 6.

A reference numeral 12e in FIG. 3 denotes a recess formed at a bottom portion of the curved piece 12c to facilitate to engage the taking of piece 13a of the tool with the curved piece 12c when the tool is inserted into the connector body.

Although the shell body 13b is hollow cylindrical, but it may be a shell partially removed as shown in phantom lines 13c, if required.

Instead of the taking-off tool 13 shown in FIG. 4, two taking-off tools each having an urging nail 14 may be used as shown in FIG. 2. The urging nails 14 are inserted into the anchoring apertures 6a of the connector body 6 so as to push the hooks 12b of the sleeve 12 inwardly toward the axis of the connector body to release the engagement of the hooks 12b of the sleeve 12 with the anchoring apertures 6a, thereby enabling the ferrule 4 to be removed out of the connector body 6.

With this arrangement, the spring urged sleeve 12 can be inserted into the connector body 6 to hold the ferrule therein by only one operation without threadedly screwing the retention sleeve 11 for the spring 9 into the connector body 6 in the prior art construction as shown in FIG. 1. Moreover, the ferrule 4 can be removed out of the connector body 6 simply by pulling the sleeve 12 out of the body without unscrewing the retention sleeve 11. The connector body 6 need not be provided with screw-threads for the retention sleeves, so that the connector body is simplified in construction. Moreover, there is no risk of incomplete connection due to untightening or loosening of the screw-threaded portions as in the prior art.

According to the invention, moreover, the sleeve 12 can be released from the anchoring apertures of the body by the taking-off tool operated in an axial direction of the connector body and a direction perpendicular to the axial direction. Therefore, in the event that the taking-off tool 13 cannot be inserted into the connector body 6 in its axial direction owing to any obstruction such as other equipment, the tools having the urging nails 14 are able to release the spring urged sleeve 12 in directions perpendicular to the axial direction. According to the invention, the difference between the outer diameter of the cylindrical body 12a of the sleeve 12 and the inner diameter of the connector body 6 is made small to render the play or clearance therein as little as possible. Even if the optical fibers are subjected to any external forces, the spring urged sleeve 12 and the ferrule 4 are held against their movements, thereby eliminating unstable connection between the optical fibers.

Although the invention has been explained referring to a plug connector, it can be applicable to a receptacle connector and particularly to a plug connector of an optical connector having photoelectric conversion elements as a receptacle connector, whose light beam receiving surface is connected to optical fibers. In the above description, although the spring urged sleeve 12 includes two curved pieces 12c, this is only by way of example, and more or fewer curved pieces could be provided as necessary.

As can be seen from the above description, the ferrule holding device for the optical fiber connector having advantages capable of simply holding and removing ferrules out of the connector.

FIGS. 5a and 5b and 6a and 6b illustrate another embodiment of the invention capable of holding and pulling ferrules from connector bodies in any directions including axial direction and a direction perpendicular thereto, wherein like components have been identified with the same reference numerals as those in FIGS. 1-4. In this embodiment, connector bodies 5 and 6 are formed with insert apertures 17 and 18 extending from exposing end faces 15 and 16 to anchoring apertures 5b and 6a formed in plural locations (two diametrically opposed locations in this embodiment) of the connector bodies 5 and 6 such that when the taking-off tools 13 shown in FIG. 4 is inserted into the bodies, tip ends of the taking-off pieces 13a of the tools are located at chamfered surfaces 12f of hooks 12b engaging in the anchoring apertures 5b and 6a. When the tools are further pushed, the hooks 12b are forced inwardly by the wedge action of the chamfered surfaces so as to disengage the hooks 12b from the anchoring apertures 5b and 6a, thereby enabling the ferrules 3 and 4 to be removed from the connector bodies 5 and 6.

With this arrangement, after a sleeve 7 and a sleeve support 5a have been removed from the connector body 5, the insert apertures 17 and 18 formed in the end faces 15 and 16 of the connector bodies 5 and 6 are not obstructed by equipment therearound, because there is enought space for disconnecting the connector bodies. Accordingly, the ferrules can easily be removed from the connector bodies 5 and 6 for the purpose of cleaning optical fibers to maintain the high transmission efficiency.

Although the insert apertures 18 for the taking-off tool are communicated with an aperture 6b for inserting the ferrule 4 into the connector body as shown in FIG. 6b, this is only by way of example, and the insert apertures may be provided so as not to communicate with the aperture 6b as shown in FIG. 7. Moreover, although the optical fibers are aligned with each other by means of the sleeves 7, this embodiment may be applicable to a connector adapted to connect optical fibers with abutment of their end faces.

The release of the ferrule can be effected in three directions in the above explanation. If it is not necessary to release the ferrule in the direction in which optical fibers are inserted into connector bodies, recesses 12e formed in bottoms of the curved pieces 12c of the sleeve 12 for inserting the tool can be dispensed with. Moreover, if it is not necessary to release the ferrule by the tool inserted into directions perpendicular to the axial direction of the connector, the anchoring apertures 5b and 6a may not be through-apertures. Furthermore, sectional configurations of the insert apertures 17 and 18 for the tools can be freely selected according to sectional shapes of the taking-off tools.

It is further understood by those skilled in the art that the foregoing description is that of preferred embodiments of the disclosed devices and that various changes and modifications may be made in the invention without departing from the spirit and scope thereof.

What is claimed is:

1. A ferrule holding device for an optical fiber connector, said connector including two connector bodies, a sleeve extending in said two connector bodies, and two ferrules respectively accomodating optical fibers therein to be aligned with each other when the ferrules are inserted in said sleeve in end-to-end relationship, said ferrules being urged by spring means so as to bring ends of said optical fibers into close contact with each other, said ferrule holding device comprising a spring urged sleeve consisting of a cylindrical body having an outer diameter somewhat smaller than an inner diameter of each said connector body, said cylindrical body being provided at plural locations with resilient curved pieces having hooks with the same thickness as the wall of said cylindrical body and having outer chamfered surfaces, said hooks being outwardly extending but depressible inwardly of an outer periphery of said cylindrical body, said resilient curved pieces being integral parts of said cylindrical body being formed such that said curved pieces are thinner than the wall of said cylindrical body with the bottom inside diameter of said parts on the same radius as the inside diameter of said cylindrical body, and said hooks being curved outwardly, and each said connector body being formed with anchoring apertures into which said hooks of said resilient curved pieces extend so as to hold said spring urged sleeve in said connector to support said spring means urging said ferrule.

2. A device as set forth in claim 1, wherein said device further comprises a taking-off tool consisting of a thin cylindrical shell body formed with taking-off pieces, said shell body being able to be inserted between said connector body and said curved pieces of said spring urged sleeve inserted therein so as to push said curved pieces inwardly toward an axis of said connector body.

3. A device as set forth in claim 2, wherein each said resilient curved piece is formed at its bottom portion with a recess to facilitate the engagment of each said taking-off piece of said tool with the resilient curved piece of the sleeve.

4. A device as set forth in claim 2, wherein each said connector body is formed with insert apertures extending from an exposing end face of said connector body to said anchoring apertures such that when said taking-off tool is inserted into said connector body, tip ends of said taking-off pieces of the tool are located at said chamfered surfaces of said hooks engaging in said anchoring apertures in the connector body so as to push said hooks inwardly toward the axis of said connector body when said tool is further inserted into the connector body.

5. A device as set forth in claim 4, wherein said insert apertures for the taking-off tool are formed in communication with an aperture formed in the connector body for inserting the ferrule.

6. A device as set forth in claim 4, wherein said insert apertures for the taking-off tool are formed so as not to communicate with an aperture formed in the connector body for inserting the ferrule.

7. A device as set forth in claim 2, wherein said thin cylindrical shell body is formed as a partially removed shell body.

8. A device as set forth in claim 1, wherein said device further comprises a taking-off tool having an urging nail which is able to be inserted into said anchoring aperture in said connector body from an external side thereof so as to push said curved piece inwardly toward an axis of said connector.

* * * * *